United States Patent
Marcaly (10) Patent No.: US 9,435,515 B2
(45) Date of Patent: Sep. 6, 2016

(54) NEAR-FIELD LENS WITH CONVEX HYPERBOLIC SURFACE

(71) Applicant: Energizer Brands, LLC

(72) Inventor: Fred W. Marcaly, Amherst, OH (US)

(73) Assignee: Energizer Brands, LLC, St. Louis, MO (US)

( * ) Notice: Subject to any disclaimer, the term of this patent is extended or adjusted under 35 U.S.C. 154(b) by 0 days.

(21) Appl. No.: 14/609,663

(22) Filed: Jan. 30, 2015

(65) Prior Publication Data

US 2015/0219313 A1 Aug. 6, 2015

Related U.S. Application Data

(60) Provisional application No. 61/933,912, filed on Jan. 31, 2014.

(51) Int. Cl.
| | |
|---|---|
| F21V 13/04 | (2006.01) |
| F21V 7/00 | (2006.01) |
| F21V 5/00 | (2015.01) |
| G02B 27/30 | (2006.01) |
| F21V 5/04 | (2006.01) |
| G02B 19/00 | (2006.01) |
| F21L 4/00 | (2006.01) |

(52) U.S. Cl.
CPC ............... *F21V 13/04* (2013.01); *F21L 4/005* (2013.01); *F21V 5/006* (2013.01); *F21V 5/04* (2013.01); *F21V 7/0075* (2013.01); *F21V 7/0091* (2013.01); *G02B 19/0028* (2013.01); *G02B 19/0047* (2013.01); *G02B 19/0061* (2013.01); *G02B 27/30* (2013.01)

(58) Field of Classification Search
CPC .......... G02B 19/0028; G02B 19/0047; F21V 7/0091; F21V 5/04
See application file for complete search history.

(56) References Cited

U.S. PATENT DOCUMENTS

| | | | |
|---|---|---|---|
| 2,215,900 A | 9/1940 | Bitner | |
| 4,767,172 A * | 8/1988 | Nichols | ................ F21V 7/0091 355/1 |
| 4,962,450 A | 10/1990 | Reshetin | |
| 6,527,411 B1 | 3/2003 | Sayers | |

(Continued)

FOREIGN PATENT DOCUMENTS

| | | |
|---|---|---|
| CN | 1037573 | 11/1989 |
| CN | 101840054 A | 9/2010 |

(Continued)

OTHER PUBLICATIONS

International Search report for WO2015013753,Apr. 2015.*

*Primary Examiner* — Tracie Y Green
(74) *Attorney, Agent, or Firm* — McDonald Hopkins LLC (57) ABSTRACT

A near-field lens is provided. The lens includes a lens body positioned about an optical axis. The lens body includes an input surface for receiving light from a light source and defined by a focusing surface and a convex hyperbolic surface. The lens body also includes an output surface through which light exits the lens body and a lateral surface extending between the convex hyperbolic surface and the output surface. The focusing surface is configured to collimate light along the optical axis towards the output surface and the convex hyperbolic surface is configured to substantially collimate light towards the lateral surface to be internally reflected towards the output surface.

6 Claims, 6 Drawing Sheets

(56) References Cited

U.S. PATENT DOCUMENTS

| | | |
|---|---|---|
| 6,547,423 B2 | 4/2003 | Marshall et al. |
| 6,724,543 B1 | 4/2004 | Chinniah et al. |
| 7,160,522 B2 | 1/2007 | Minano Dominguez et al. |
| 7,329,904 B2 | 2/2008 | Nawashiro et al. |
| 7,349,163 B2 | 3/2008 | Angelini et al. |
| 7,474,474 B2 | 1/2009 | Angelini et al. |
| 7,837,349 B2 | 11/2010 | Chinniah et al. |
| 7,843,654 B2 | 11/2010 | Destain |
| 8,016,451 B2 | 9/2011 | Householder et al. |
| 8,430,536 B1 | 4/2013 | Zhao |
| 2002/0080615 A1* | 6/2002 | Marshall ............... F21V 5/04 362/333 |
| 2008/0310028 A1 | 12/2008 | Chinniah et al. |
| 2009/0128921 A1* | 5/2009 | Roth ...................... F21V 5/04 359/641 |
| 2010/0226127 A1 | 9/2010 | Bigliatti et al. |
| 2011/0270585 A1 | 11/2011 | Chen et al. |
| 2012/0250331 A1* | 10/2012 | De Lamberterie .. F21S 48/1154 362/311.1 |
| 2013/0044494 A1* | 2/2013 | Dross ................. G02B 19/0061 362/297 |
| 2014/0316742 A1* | 10/2014 | Sun .................... G02B 19/0066 702/167 |

FOREIGN PATENT DOCUMENTS

| | | |
|---|---|---|
| CN | 201811101 U | 4/2011 |
| CN | 202868566 U | 4/2013 |
| CN | 103185245 A | 7/2013 |
| EP | 0354961 A1 | 2/1990 |
| EP | 2573452 A2 | 3/2013 |
| GB | 2324364 A | 10/1998 |
| JP | 2010129447 A | 6/2010 |
| WO | 2008152576 A1 | 12/2008 |
| WO | 2009110011 A1 | 9/2009 |
| WO | 2013022040 A1 | 2/2013 |
| WO | 2013035036 A1 | 3/2013 |

\* cited by examiner

NEAR-FIELD LENS WITH CONVEX HYPERBOLIC SURFACE

CROSS REFERENCE TO RELATED APPLICATION

This application claims the benefit of U.S. Provisional Application No. 61/933,912 filed Jan. 31, 2014, entitled "NEAR-FIELD LENS WITH CONVEX HYPERBOLIC SURFACE," the aforementioned related application is hereby incorporated by reference.

FIELD OF THE INVENTION

The invention is generally related to a near-field lens, and more particularly, to a near-field lens for use in a portable lighting device.

BACKGROUND OF THE INVENTION

Current near-field lens designs employed in portable lighting devices typically tend to have relatively low optical efficiency. Therefore, there is a need for a near-field lens that offers enhanced optical efficiency.

SUMMARY OF THE INVENTION

According to one aspect of the present invention, a near-field lens is provided. The lens includes a lens body positioned about an optical axis. The lens body includes an input surface for receiving light from a light source and defined by a focusing surface and a convex hyperbolic surface. The lens body also includes an output surface through which light exits the lens body and a lateral surface extending between the convex hyperbolic surface and the output surface. The focusing surface is configured to collimate light along the optical axis towards the output surface and the convex hyperbolic surface is configured to substantially collimate light towards the lateral surface to be internally reflected towards the output surface.

Embodiments of the aforementioned aspect of the invention can include any one or a combination of the following features:
the convex hyperbolic surface is configured to substantially collimate light towards the lateral surface to be at least 65 percent, preferably at least 70 percent, more preferably at least 90 percent, and most preferably essentially 100 percent internally reflected towards the output surface;
the focusing surface is recessed away from the light source and is positioned about the optical axis and is symmetric about the optical axis;
the convex hyperbolic surface is positioned proximate to the light source and encloses the focusing surface and extends between the focusing surface and the lateral surface;
the convex hyperbolic surface is symmetric about the optical axis and is defined by a plurality of convex hyperbolic sections that are equidistant from the optical axis;
each of the plurality of convex hyperbolic sections are positioned about a corresponding transverse axis that crosses the optical axis at a common intersection point, which coincides with the light source and results in each of the plurality of convex hyperbolic sections being equidistant from the light source;
the lateral surface is conical and has a focus that coincides with a virtual focus of the convex hyperbolic surface that is located at a distance away from the light source;
the output surface includes a center section that is recessed towards the focusing surface and a connecting section forming a sidewall that extends between the center section and the output surface; and
the center section and the connecting section together define a cavity that is free from being impinged by any light reflected from the lateral surface.

According to another aspect of the present invention, a near-field lens is provided that includes a lens body positioned about an optical axis. The lens body includes a convex hyperbolic surface that receives light from a light source and is symmetric about the optical axis, wherein the convex hyperbolic surface is defined by a plurality of convex hyperbolic sections that are equidistant from the optical axis. The lens body also includes an output surface through which light exits the lens body and a lateral surface extending between the convex hyperbolic surface and the output surface. The convex hyperbolic surface is configured to substantially collimate light towards the lateral surface to be internally reflected towards the output surface.

Embodiments of this aspect of the invention can include any one or a combination of the following features:
the convex hyperbolic surface is configured to substantially collimate light towards the lateral surface to be at least 65 percent, preferably at least 70 percent, more preferably at least 90 percent, and most preferably essentially 100 percent internally reflected towards the output surface;
the near-field lens includes a focusing surface configured to collimate light along the optical axis towards the output surface and is recessed away from the light source, wherein the focusing surface is positioned about the optical axis and is symmetric about the optical axis and the convex hyperbolic surface is positioned proximate to the light source and encloses the focusing surface and extends between the focusing surface and the lateral surface;
each of the plurality of convex hyperbolic sections are positioned about a corresponding transverse axis that crosses the optical axis at a common intersection point, which coincides with the light source and results in each of the plurality of convex hyperbolic sections being equidistant from the light source;
the lateral surface is conical and has a focus that coincides with a virtual focus of the convex hyperbolic surface that is located at a distance away from the light source;
the output surface includes a center section that is recessed towards the focusing surface and a connecting section forming a sidewall that extends between the center section and the output surface;
the center section and the connecting section together define a cavity that is free from being impinged by any light reflected from the lateral surface; and
the near-field lens is used in a portable lighting device.

According to a further aspect of the present invention, a portable lighting device is provided and includes a housing and a near-field lens supported in the housing. The near-field lens includes a lens body positioned about an optical axis. The lens body includes a convex hyperbolic surface that receives light from a light source and is symmetric about the optical axis, wherein the convex hyperbolic surface is defined by a plurality of convex hyperbolic sections that are each positioned about a corresponding transverse axis that crosses the optical axis at a common intersection point coinciding with the light source such that each of the plurality of convex hyperbolic sections are equidistant from the light source and the optical axis. The lens body also includes an output surface through which light exits the lens body and a lateral surface extending between the convex hyperbolic surface and the output surface. The plurality of convex hyperbolic sections of the convex hyperbolic surface are configured to substantially collimate light towards the lateral surface to be internally reflected towards the output surface.

Embodiments of this further embodiment can include any one or a combination of the following features:
- the convex hyperbolic surface is configured to substantially collimate light towards the lateral surface to be at least 65 percent, preferably at least 70 percent, more preferably at least 90 percent, and most preferably essentially 100 percent internally reflected towards the output surface;
- the lens body includes a focusing surface configured to collimate light along the optical axis towards the output surface and is recessed away from the light source, wherein the focusing surface is positioned about the optical axis and is symmetric about the optical axis and the convex hyperbolic surface is positioned proximate to the light source and encloses the focusing surface and extends between the focusing surface and the lateral surface;
- the lateral surface is conical and has a focus that coincides with a virtual focus of the convex hyperbolic surface that is located at a distance away from the light source;
- the output surface includes a center section that is recessed towards the focusing surface and a connecting section forming a sidewall that extends between the center section and the output surface; and
- the center section and the connecting section together define a cavity that is free from being impinged by any light reflected from the lateral surface.

These and other features, advantages and objects of the present invention will be further understood and appreciated by those skilled in the art by reference to the following specification, claims and appended drawings.

Unless otherwise specified, the following definitions and methods are used herein:
"top," "bottom," "up," down," "left" and "right" are directions and locations with respect to the near-field lens as oriented in the drawings.

DESCRIPTION OF THE PREFERRED EMBODIMENT

The embodiments described herein refer to a near-field lens intended for use in portable lighting devices. However, it is recognized that the near-field lens may also warrant use in other lighting applications as well.

Figure 1:
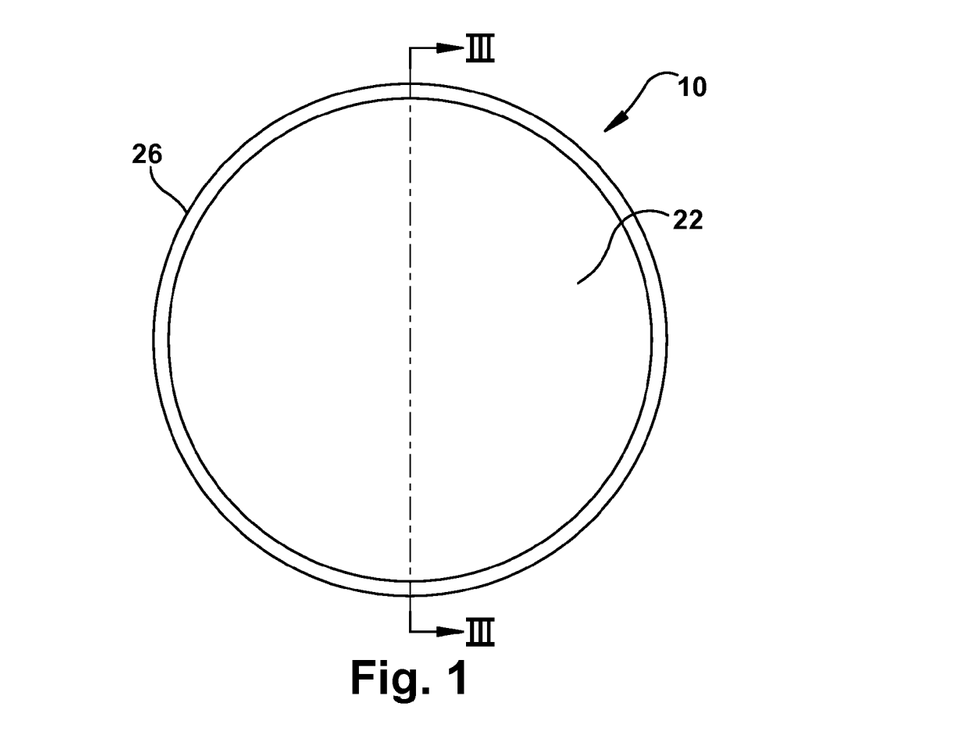
FIG. 1 is a front view of a near-field lens according to one embodiment of the present invention.
Figure 2:
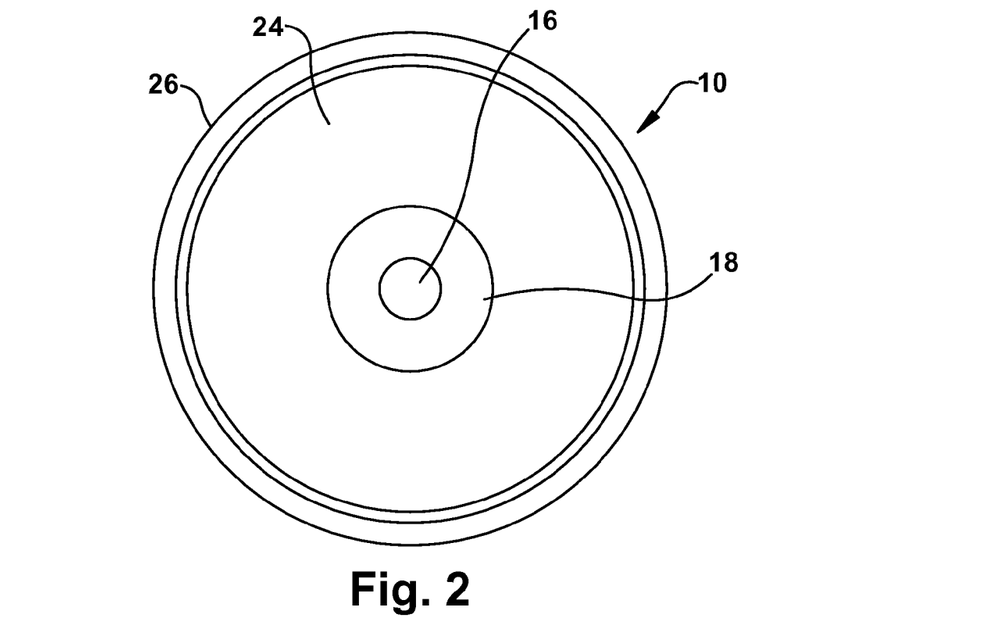
FIG. 2 is a rear view of the near-field lens shown in FIG. 1.
Figure 3:
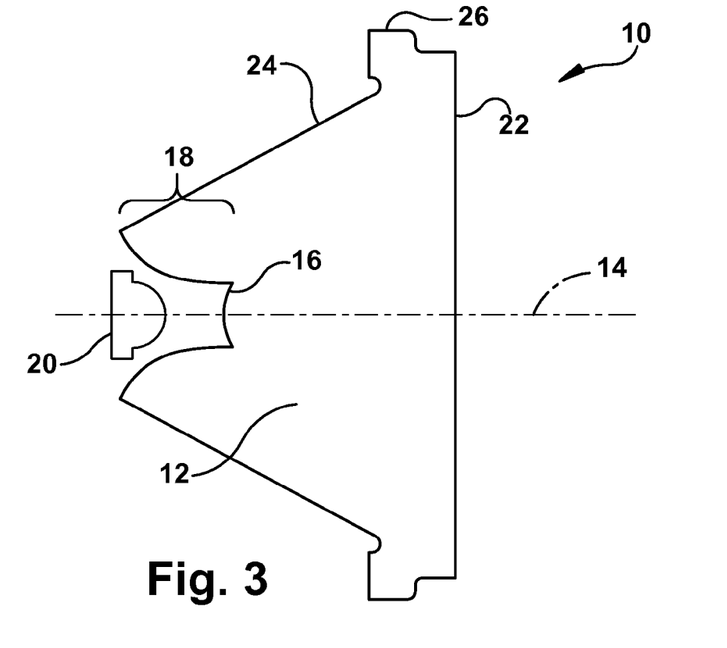
FIG. 3 is a cross sectional view of the near-field lens taken along lines III-III in FIG. 1.

Referring to FIGS. 1-3, a near-field lens 10 is shown according to one embodiment and includes a lens body 12 positioned about an optical axis 14. The lens body 12 includes an input surface located at the rear of the lens 10 and defined by a focusing surface 16 and a convex hyperbolic surface 18. The focusing surface 16 and the convex hyperbolic surface 18 are positioned to each receive a portion of light from a light source 20 positioned about the optical axis 14 such that the lens 10 and the light source 20 have coinciding optical axes (i.e. optical axis 14). Light propagating within the lens 10 eventually exits the lens 10 via an output surface 22 located at the front of the lens 10. The output surface 22 can be flat and perpendicular to the optical axis 14. Alternatively, the output surface 22 can be oriented at an angle with respect to the optical axis 14 and/or include other surface configurations for purposes of dispersing or focusing light exiting the lens 10. The output surface 22 is connected to the input surface via a lateral surface 24 extending between the convex hyperbolic surface 18 and the output surface 22. For exemplary purposes, an engagement member 26 can be formed in the lateral surface 24 to provide a means for securing the lens 10 to a lens holder (not shown) that can be used to precisely locate the light source 20. In view of the above, it should be appreciated that the lens 10 can be provided as a single integrated component. Further, the lens 10 can be constructed from a transparent polymer or other light transmitting material using injection molding or other suitable methods.

Figure 4:
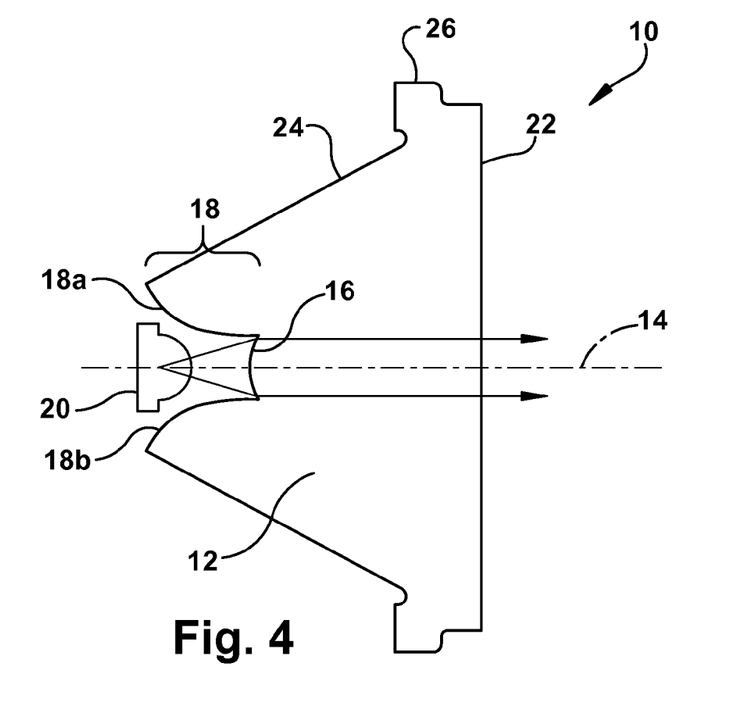
FIG. 4 illustrates exemplary light ray traces representing light emitted from a light source and propagating through the near-field lens shown in FIG. 3.

As best shown in FIG. 3, the focusing surface 16 of the input surface is positioned about the optical axis 14 and is also symmetric about the optical axis 14. Additionally, the focusing surface 16 is recessed away from the light source 20 and positioned to face the same so as to receive a portion of light emitted from the light source 20 that is outputted in a forward direction. When light is received, the focusing surface 16 directs the light towards the output surface 22 as a collimated beam of light propagating along the optical axis 14. To this end, the focusing surface 16 can be a convex hyperbolic surface or other curved surface capable of generating a collimated light beam that is in relatively close proximity to the optical axis 14. With respect to the illustrated embodiment, the collimated light beam generated by the focusing surface 16 does not undergo refraction when passing through the output surface 22, by virtue of the output surface being oriented perpendicularly to the optical axis 14. The foregoing process is shown in FIG. 4, where exemplary light rays emitted from the light source 20 are received by the focusing surface 16 and subsequently collimated along the optical axis 14. The collimated light then exits the lens 10 via the output surface 22 without underoing refraction. However, as previously mentioned, it should be appreciated that the output surface 22 can take on other orientations and surface configurations to alter the path in which light exits the lens 10.

Referring back to FIG. 3, the convex hyperbolic surface 18 encloses the focusing surface 16 and extends between the focusing surface 16 and the lateral surface 24. The convex hyperbolic surface 18 is symmetric about the optical axis 14 and is defined by a plurality of convex hyperbolic sections, two of which, are shown in FIG. 3 as sections 18a and 18b, and all of which, are equidistant from the optical axis 14. In such a configuration, each section (e.g. 18a) is opposite from another section (e.g. 18b) and is positioned proximate to the light source 20 so as to receive a portion of light that is outputted laterally from the light source 20, which can be a light emitting diode (LED) or other suitable light type. With respect to the embodiments described herein, each section of the convex hyperbolic surface 18 should be construed to correspond to a curve of a hyperbola and is governed by the same principles.

Figure 5:
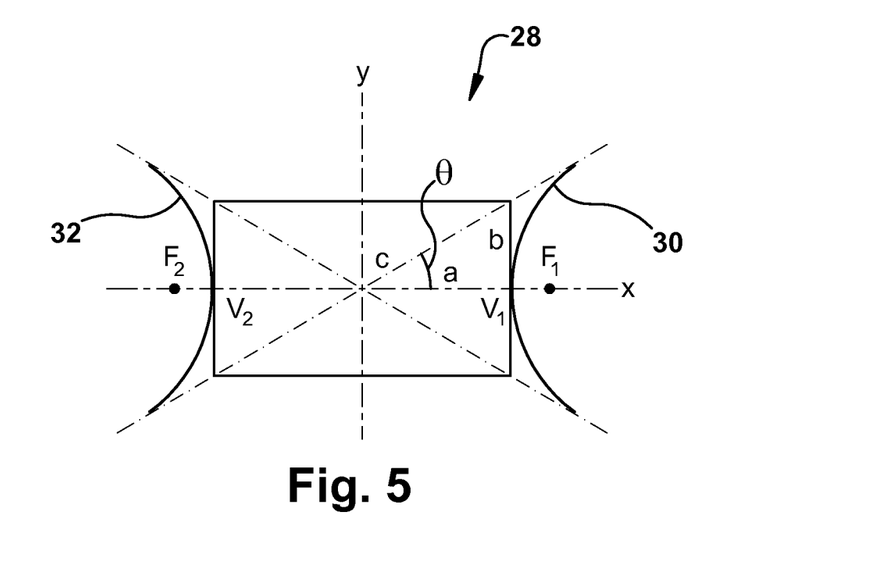
FIG. 5 generally illustrates the characteristics of a hyperbola.

To gain a better understanding, a hyperbola 28 is generally shown in FIG. 5 having a first curve 30 with focus $F_1$ and virtual focus $F_2$ and a second curve 32 with focus $F_2$ and virtual focus $F_1$. As shown, each focus $F_1$, $F_2$ lies on a horizontal transverse axis x that intersects each curve 30, 32 through a corresponding vertex $V_1$, $V_2$, respectively. As is known in the art, the hyperbola 28 can have the following general equation:

$$\frac{x^2}{a^2} - \frac{y^2}{b^2} = 1$$

where "a," referred to herein as the semi-axis, is a distance from center O of the hyperbola 28 to either vertex $V_1$, $V_2$ and "b," referred to herein as the semi-width, is the length of a perpendicular segment drawn from each vertex $V_1$, $V_2$ to the asymptotes of the hyperbola 28, which are shown by diagonal lines that intersect through the center C of the hyperbola 28. Since each curve 30, 32 of the hyperbola 28 approaches the asymptotes without ever intersecting them, it can be seen that the curvature of the hyperbola 28 can be manipulated by changing an angle θ between the asymptotes and the transverse axis x of the hyperbola 28. Angle θ, referred to herein as the asymptote angle, is defined by the following relation:

$$\phi = \tan^{-1}\frac{b}{a}$$

where "a" is the semi-axis and "b" is the semi-width, as described previously. Thus, by selecting appropriate semi-axis and semi-width values, the asymptote angle can be increased to provide curves 30 and 32 with less curvature or decreased to provide curves 30 and 32 with greater curvature. When this property is applied to each section of the convex hyperbolic surface 18 in the context of light collection, it becomes evident that increasing the asymptote angle (i.e. decreasing curvature) would allow each section of the convex hyperbolic surface 18 to provide a larger surface for receiving light from the light source 20.

With the abovementioned principles in mind, one embodiment of the lens 10 will now be described in greater detail in reference to FIG. 6. As shown, each section (e.g. section 18a and 18b) of the convex hyperbolic surface 18 is positioned about a corresponding transverse axis 34 that crosses the optical axis 14 at a common intersection point 36, which coincides with the light source 20, such that each section of the convex hyperbolic surface 18 is equidistant from the light source 20. By adjusting the angle between the transverse axes 34 and the optical axis, one can either increase or decrease the diameter of the lens 10 in a predictable manner.

Figure 6:
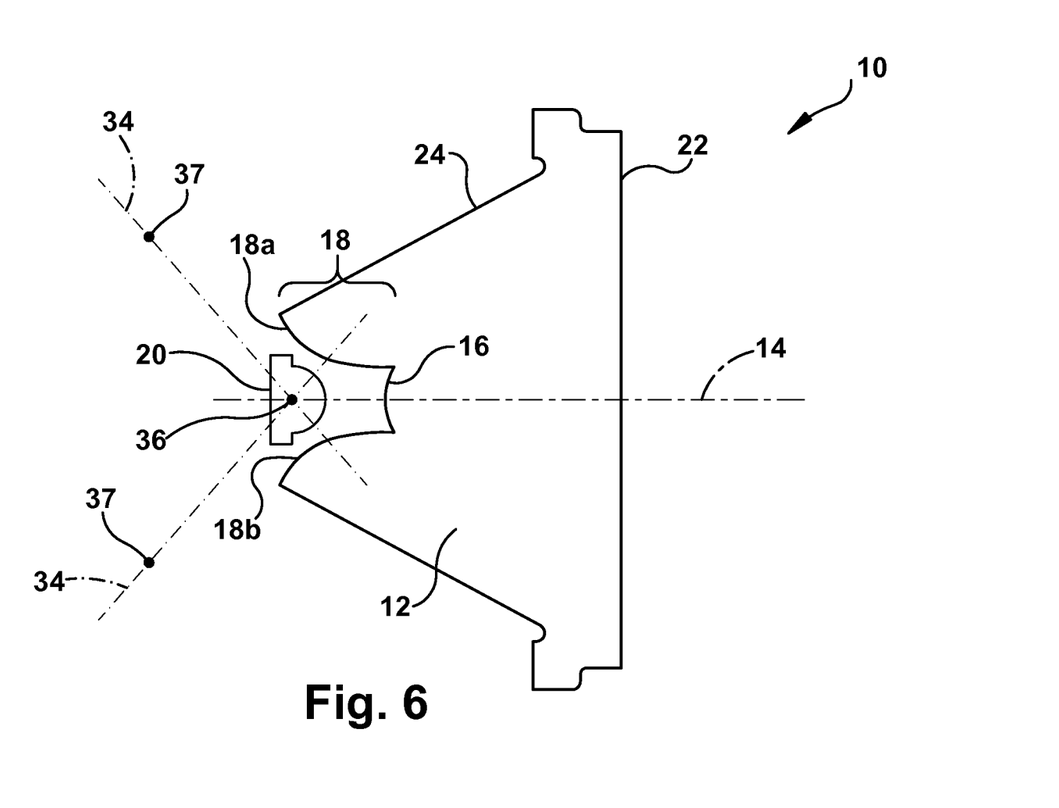
FIG. 6 is a cross sectional view of a near-field lens according to one embodiment of the present invention.
Figure 7:
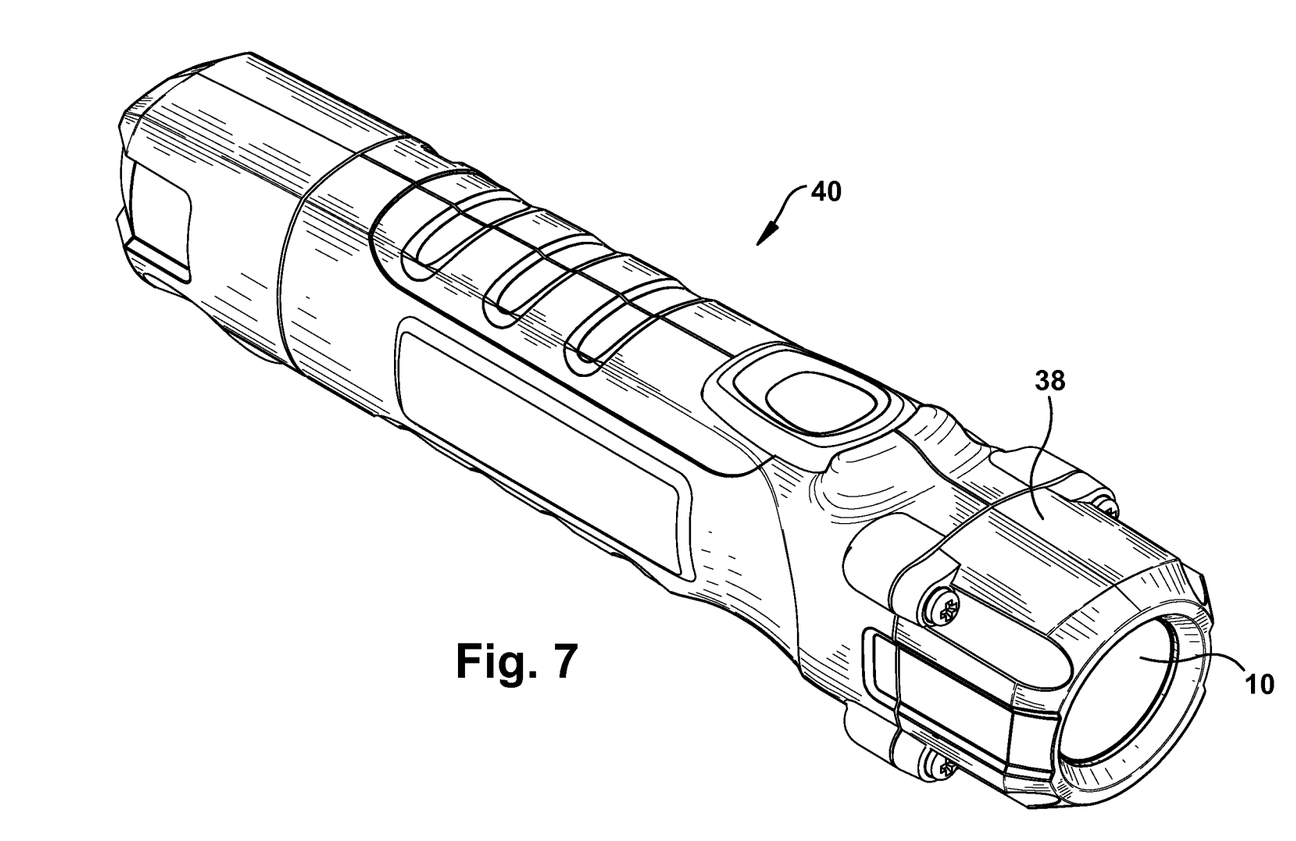
FIG. 7 generally illustrates a near-field lens being used in a handheld flashlight, according to one embodiment of the present invention.
Figure 8:
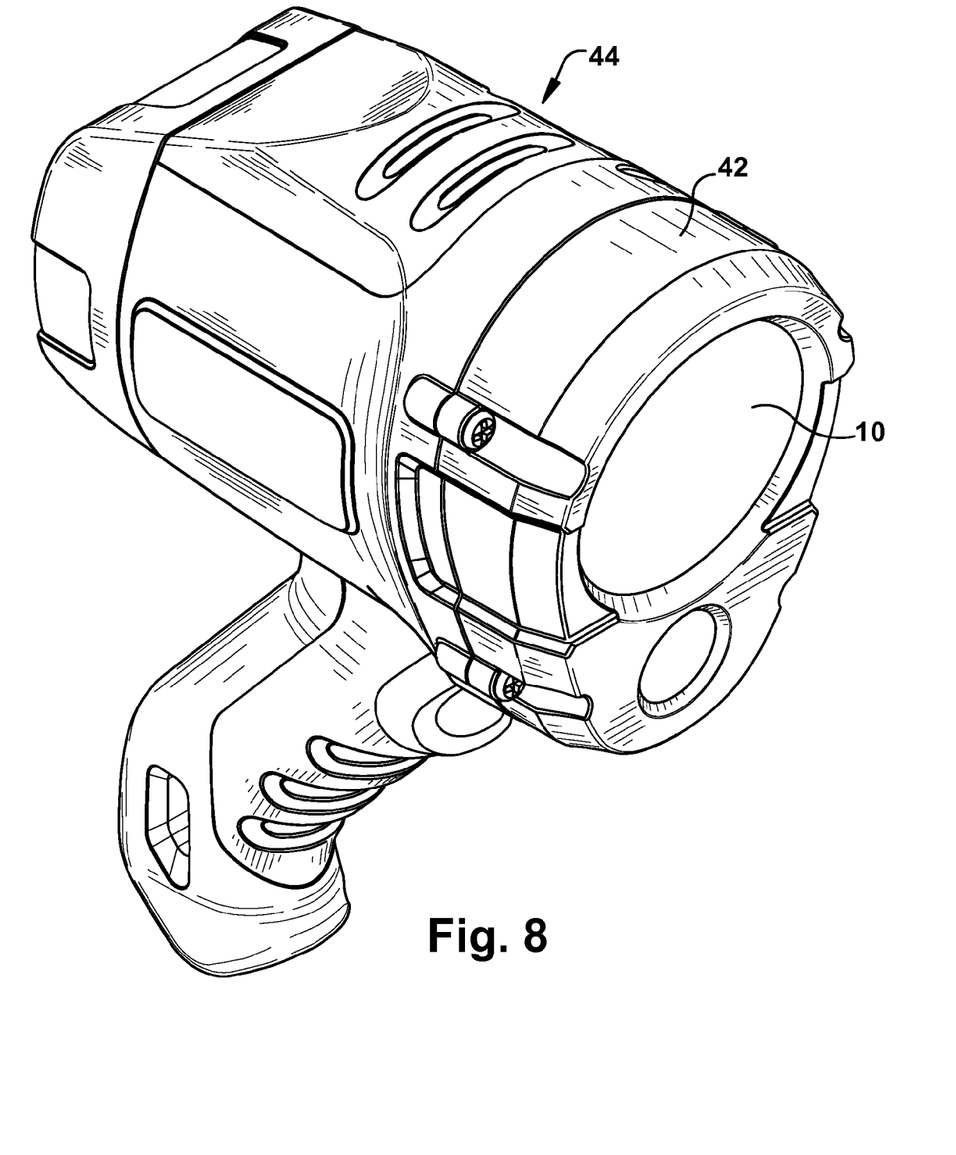
FIG. 8 generally illustrates a near-field lens being used in a handheld spotlight, according to one embodiment of the present invention.

As is further shown in FIG. 6, each section, such as sections 18a and 18b, has a corresponding virtual focus 37 located at a distance away from the light source 20. It should be appreciated that when the virtual focus 37 is located at a greater distance from the light source, a relatively small blur diameter can be achieved. Furthermore, a smaller representation of the virtual source in the light output of the lens 10 can also be achieved, thereby yielding a smaller viewing angle (FWHM) and a more tightly collimated beam. For instance, a lens 10 made in accordance with the principles described herein can have a light distribution having a viewing angle (FWHM) of less than 12 degrees. Thus, if the lens 10 is used in a portable lighting device, a user will benefit from a longer light beam and brighter spot, which results in the user being able to see more clearly over greater distances. For purposes of illustration, the lens 10 is generally shown supported in a housing 38 of a handheld flashlight 40 in FIG. 7. The lens 10 is also generally shown supported in a housing 42 of a handheld spotlight 44 in FIG. 8. It should be appreciated that the lens can be used with other types of portable lighting devices of various dimensions.

In operation, light emitted from the light source 20 that is incident on the convex hyperbolic surface 18 is substantially collimated towards the lateral surface 24 to be at least 65 percent, preferably at least 70 percent, more preferably at least 90 percent, and most preferably essentially 100 percent internally reflected towards the output surface 22 of the lens 10. According to one embodiment, the lateral surface 24 can be defined by a plurality of conic sections (e.g. parabolic or elliptical), each having a focus that coincides with the virtual focus 36 of a corresponding section of the convex hyperbolic surface 18, thereby providing a surface normal such that total internal reflection occurs and the resulting collimated light beam is reflected along the optical axis 14 in the intended direction. For exemplary purposes, the output surface 22 can be oriented perpendicularly to the optical axis 14 such that the collimated light beam reflected from the lateral surface 24 does not undergo refraction when passing through the output surface 22.

Figure 9:
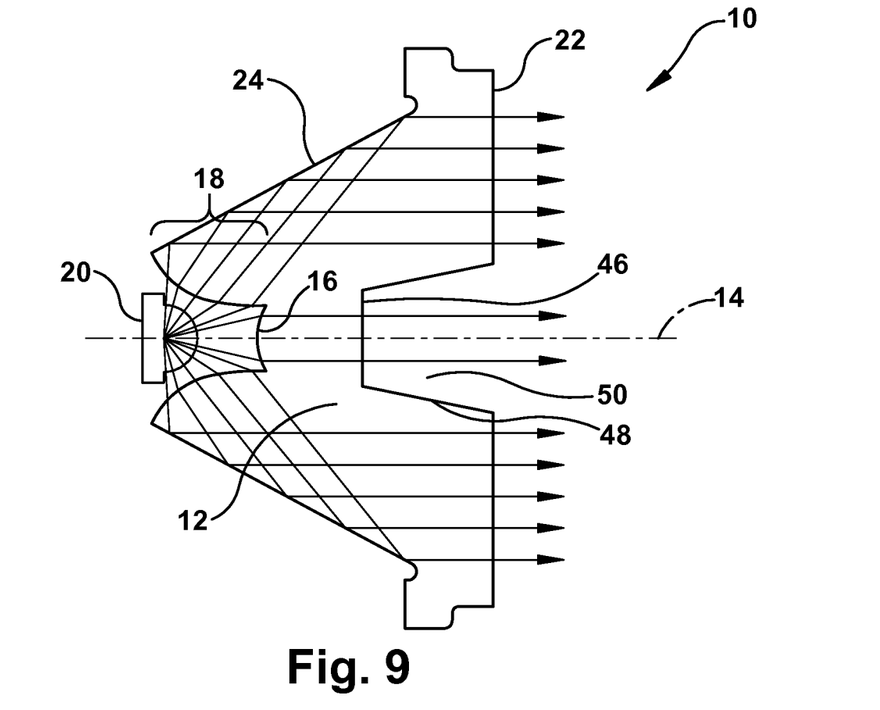
FIG. 9 illustrates exemplary light ray traces representing light emitted from a light source and propagating through a near-field lens, according to one embodiment of the present invention.

The foregoing process is shown in FIG. 9, where exemplary light rays emitted in a lateral direction from the light source 20 are received by the convex hyperbolic surface 18 and substantially collimated towards the lateral surface 24, which internally reflects the light rays towards the output surface 22. As previously mentioned, the convex hyperbolic surface 18 can be configured to substantially collimate light towards the lateral surface to be at least 65 percent, preferably at least 70 percent, more preferably at least 90 percent, and most preferably essentially 100 percent internally reflected towards the output surface 22 of the lens 10. As used herein, the term "substantially collimated" is meant to describe light rays that are parallel or nearly parallel with one another.

As is additionally shown in FIG. 9, exemplary light rays emitted in a forward direction from the light source 20 are received by the focusing surface 16 and collimated along the optical axis 14 towards the output surface 22. Thus, it can be seen that the focusing surface 16 and the convex hyperbolic surface 18 can cooperate to collect a substantial amount of light emitted from the light source 20 despite its relatively large viewing angle (FWHM).

As is further shown in FIG. 9, the output surface 22 can optionally include a center section 46 that is recessed towards the focusing surface 16 of the lens 20 and a connecting section 48 that forms a sidewall extending between the center section 46 and the output surface 22. The center section 46 and the connecting section 48 together define a cavity 50 that has a truncated conical shape and is free from being impinged by any light reflected from the lateral surface 24. Since the center section 46 is flat and perpendicular to the optical axis 14, the collimated light beam generated by the focusing surface 16 is able to pass therethrough without undergoing refraction. By including the cavity 50, the thickness of the lens 10 is decreased, which can provide for a reduction in manufacturing time and cost when using injection molding. It should be appreciated that the cavity 50 may be made deeper to or even made to extend past the focusing surface 16, thereby allowing removal of the same. Further, while the output surface 22 has been typically described herein as having a flat configuration, it should be appreciated that other surface configurations can be used. For instance, the output surface 22 can be spherical to allow light exiting the lens 10 to be focused onto a small target such as a fiber optic, light guide, and the like. Conversely, the output surface 22 can include diffusing optics for spreading light exiting from the lens 10.

Accordingly, a near-field lens has been advantageously described herein. By employing a convex hyperbolic surface, the lens is able to collect a greater amount of light from the light source and is thereby able to benefit from improved optical efficiency.

All references cited herein are expressly incorporated herein by reference in their entireties. To the extent publications and patents or patent applications incorporated by reference contradict the disclose contained in the present specification, the present specification is intended to supersede and/or take precedence over any such contradictory material.

It will be understood by those who practice the invention and those skilled in the art that various modifications and improvements may be made to the invention without departing from the spirit of the disclosed concept. The scope of protection afforded is to be determined by the claims and by the breadth of interpretation allowed by law.

The invention claimed is:

1. A portable lighting device comprising:
   a housing;
   a light source positioned in the housing proximate to a near-field lens supported in the housing and comprising a lens body positioned about an optical axis, the lens body comprising:
   a substantially flat output surface through which light exits the lens body;
   an input surface through which light enters the lens body consisting of: a) a focusing surface centered symmetrically around the optical axis, wherein the focusing surface receives light directly from the light source and collimates the received light along the optical axis towards the output surface without undergoing refraction when passing through the output surface, and b) a single convex hyperbolic surface centered symmetrically around both the optical axis and the focusing surface, wherein said convex hyperbolic surface receives light directly from the light source and is further defined by a plurality of transverse axes, each of said transverse axes intersecting the convex hyperbolic surface at different points and crossing the optical axis at a common intersection point coinciding with the light source such that each of the plurality of convex hyperbolic sections are equidistant from the light source and the optical axis; and
   a lateral surface extending between the convex hyperbolic surface and the output surface, wherein the convex hyperbolic surface substantially collimates light towards the lateral surface to be internally reflected towards the output surface.

2. The portable lighting device of claim 1, wherein the lateral surface is conical and has a focus that coincides with a virtual focus of the convex hyperbolic surface that is located at a distance away from the light source.

3. A portable lighting device comprising:
   a housing;
   a light source positioned in the housing proximate to a near-field lens supported in the housing and comprising a lens body positioned about an optical axis, the lens body comprising:
   an output surface through which light exits the lens body having a center section that is recessed towards a focusing surface of the lens body and a connecting section forming a sidewall that extends between the center section and the output surface, wherein substantially all of the output surface oriented in a perpendicular plane to the optical axis are substantially flat;
   an input surface through which light enters the lens body consisting of: a) a focusing surface centered symmetrically around the optical axis, wherein the focusing surface receives light directly from the light source and collimates the received light along the optical axis towards the output surface without undergoing refraction when passing through the output surface, and b) a single convex hyperbolic surface centered symmetrically around both the optical axis and the focusing surface, wherein said convex hyperbolic surface receives light directly from the light source and is further defined by a plurality of transverse axes, each of said transverse axes intersecting the convex hyperbolic surface at different points and crossing the optical axis at a common intersection point coinciding with the light source such that each of the plurality of convex hyperbolic sections are equidistant from the light source and the optical axis; and
   a lateral surface extending between the convex hyperbolic surface and the output surface, wherein the convex hyperbolic surface substantially collimates light towards the lateral surface to be internally reflected towards the output surface.

4. The portable lighting device of claim 3, wherein the center section and the connecting section together define a cavity that is free from being impinged by any light reflected from the lateral surface.

5. The portable lighting device of claim 3, wherein the lens body further comprises an engagement member proximate to the lateral surface and the output surface, said engagement member attached to at least one of: the housing and the light source.

6. The portable lighting device of claim 1, wherein the lens body further comprises an engagement member proximate to the lateral surface and the output surface, said engagement member attached to at least one of: the housing and the light source.

* * * * *